United States Patent [19]

Sydansk

[11] Patent Number: 4,673,040

[45] Date of Patent: Jun. 16, 1987

[54] PERMEABILITY RESTORATION OF DAMAGED FORMATIONS

[75] Inventor: Robert D. Sydansk, Littleton, Colo.

[73] Assignee: Marathon Oil Company, Findlay, Ohio

[21] Appl. No.: 853,305

[22] Filed: Apr. 17, 1986

[51] Int. Cl.$^4$ ...................... E21B 43/25; E21B 43/22
[52] U.S. Cl. ................................... 166/305.1; 166/274
[58] Field of Search ...................... 166/305.1, 274, 273, 166/271, 307, 268, 300

[56] References Cited

U.S. PATENT DOCUMENTS

| 4,031,959 | 6/1977 | Henderson | 166/307 |
| 4,280,560 | 7/1981 | Sydansk | 166/305.1 |
| 4,478,283 | 10/1984 | Sydansk | 166/292 |
| 4,572,297 | 2/1986 | Thigpen, Jr. et al. | 166/307 |

OTHER PUBLICATIONS

Grim, R. E., *Applied Clay Mineralogy*, McGraw Hill Book Co., Inc., N.Y., 1962, pp. 298–306.
Smith, C. F., et al., "Potassium, Calcium Treatments Inhibit Clay Swelling," *The Oil and Gas Journal*, Nov. 30, 1964, pp. 80–81.
Atwood, D. K., "Restoration of Permeability to Water-Damaged Cores," *Jour. of Petroleum Technology*, Dec. 1964, pp. 1405–1410.
Veley, C. D., "How Hydrolyzable Metal Ions React with Clays to Control Formation Water Sensitivity," *Jour. of Petroleum Technology*, Sep. 1969, pp. 1111–1118.
Muecke, T. W., ♭Formation Fines and Factors Controlling Their Movement in Porous Media," *Jour. of Petroleum Technology*, Feb. 1979, pp. 144–150.
Gruesbeck, C. and Collins, R. E., "Entrainment and Deposition of Fine Particles in Porous Media," *Soc. of Petroleum Engineers Jour.*, Dec. 1982, pp. 847–856.
Gabriel, G. A. and Inamdar, G. R., "An Experimental Investigation of Fines Migration in Porous Media," SPE Paper 12168, 58th Annual Tech. Conf., San Francisco, CA, Oct. 5–8, 1983.
Sharma, M. M., "Permeability Impairment Due to Fines Migration in Sandstones," SPE Paper 14819, 7th SPE Symp. on Formation Damage Control, Lafayette, LA, Feb. 26–27, 1986.

*Primary Examiner*—Stephen J. Novosad
*Attorney, Agent, or Firm*—Jack L. Hummel; Rodney F. Brown

[57] ABSTRACT

Permeability to a subterranean hydrocarbon-bearing formation having sustained damage from exposure to an encroaching fluid is restored and maintained by treating the formation with a damage-reversing brine followed by a stabilizing solution.

22 Claims, No Drawings

PERMEABILITY RESTORATION OF DAMAGED FORMATIONS

BACKGROUND OF THE INVENTION

1. Technical Field:

The invention relates to a process for improving oil recovery from a permeability-damaged subterranean sandstone formation and more particularly to a process for restoring permeability to a formation which has been damaged by encroaching fluids and thereafter for stabilizing clays and other fine particles present in the formation to improve oil recovery therefrom.

2. Description of Related Art:

Aqueous fluids flowing through or otherwise encroaching into a subterranean oil-bearing sandstone formation containing clays and other fine particles often result in reduced permeability and fluid flow and subsequent reduced oil production or fluid injection in the formation. Aqueous fluids can encroach into a subterranean formation from a variety of sources, such as an underlying aquifer, a secondary or tertiary oil recovery flood or treatment fluids utilized in the well.

At least two types of damage have been shown to occur when aqueous fluids encroach into a formation. The first type of damage is permeability reduction due to the mobilization, migration, and plugging of the formation matrix by fine particles. The encroaching fluid chemically or mechanically detaches the fine particles from the pore bodies of the sandstone matrix as the fluid flows through the matrix. The fluid entrains the fine particles and conveys them to permeability-reducing positions in the pore throats of the matrix where the fine particles bridge and inhibit flow of other desirable fluids through the matrix.

The phenomenon of fine particle migration is discussed in the literature. See Muecke, T. W., "Formation Fines and Factors Controlling Their Movement in Porous Media," *Journal of Petroleum Technology*, February 1979, page 144; and Gabriel, G. A. and Inamdar, G. R., "An Experimental Investigation of Fines Migration in Porous Media," paper SPE 12168 presented at the 58th Annual Technical Conference, San Francisco, Calif., Oct. 5–8, 1983.

A second type of damage results from the swelling of clays, such as montmorillonite, which also causes permeability reduction in the formation. With regard to swelling, fresh water is generally the most damaging encroaching fluid because a substantial difference usually exists between the ionic content of fresh water and the connate water.

A number of brines have been investigated which stabilize clays and other fines against migration or swelling. The brines either result in minimal damage when they contact the formation or reduce the risk of future damage when fresh water subsequently contacts the formation. See Grim, R. E., *Applied Clay Mineralogy*, McGraw Hill Book Company, Inc. N.Y., 1962, beginning at page 298; Smith, C. F., et al, "Potassium, calcium treatments inhibit clay swelling," *The Oil and Gas Journal*, November 30, 1964, p. 80; U.S. Pat. No. 4,280,560 to Sydansk; and U.S. Pat. No. 4,572,297 to Thigpen, J. R. et al.

The above-cited treatment processes have been shown to effectively stabilize clays and other fine particles in a formation and reduce the risk of future formation damage. However, an effective remedial treatment is needed to restore the permeability of formations which have already been damaged by encroaching fluids and to reduce the likelihood subsequent permeability reduction caused by continued fluid encroachment.

SUMMARY OF THE INVENTION

The present invention provides a two-stage process for restoring permeability to formations damaged by fluid encroachment and for reducing the risk of subsequent damage to the formation from fluid encroachment. The process is effected by first injecting a damage-reversing brine solution into a wellbore penetrating the formation. The brine treats the permeability-reducing fine particles under conditions which reverse damage and restore permeability to the formation. Injection of the damage-reversing brine is followed by injection of a stabilizing solution into the wellbore to stabilize the treated fine particles and minimize the risk of present damage recurring or future damage occurring due to the encroachment of aqueous fluids.

DESCRIPTION OF PREFERRED EMBODIMENTS

The present invention relates to a remedial process for stabilizing clays and other fine particles present in a water-sensitive subterranean sandstone formation. The process is advantageously applied to a near wellbore region which has already experienced permeability damage caused by encroaching aqueous fluids.

As utilized throughout this description, the term "damage" refers to a reduction in permeability and a concurrent reduction in fluid flow in a formation over time. Formation damage may be caused chemically by a variation in ionic makeup between the encroaching aqueous fluids and the connate water or may be caused mechanically by encroaching fluids flowing through the formation at an excessively high velocity. The term "clay and other fine particle stabilization" refers to treating a sandstone formation in such a manner as to substantially prevent permeability damage and fluid flow reduction by an encroaching fluid. "Encroaching fluid" refers to any fluid entering the formation from an external source and is inclusive of reinjected produced waters and other injection fluids.

Fine particles which contribute to permeability damage include all swelling and potentially mobile fine particles present within sandstone pore bodies. Fine particles are those particles which have diameters less than 37 micrometers. Examples of fine particles which can contribute to permeability damage are clays, high surface area silica, minerals, mica, feldspars, and barite. As utilized throughout this description, the term "clays" encompasses both swelling clays, such as montmorillonite, vermiculite, swelling chlorite, and mixed-layered swelling clays and migratable clays, such as poorly cemented kaolinite and illite clay particles. "Mixed-layer swelling clays" is inclusive of layered mixture of swelling and non-swelling clays which will swell when contacted with fresh water. The term "fresh water" refers to an aqueous solution which has a relatively low concentration of dissolved salts, including monovalent cations.

The process of the present invention is performed in two stages. The first stage comprises the injection of a first treatment fluid, a damage-reversing brine, into a wellbore penetrating a water-sensitive subterranean hydrocarbon-bearing sandstone formation which exhibits permeability reduction due to previous permeability damage. The wellbore may be an injection or production wellbore.

The term "damage-reversing brine" as used herein refers to a brine which is capable of reversing permeability damage in a formation caused by either fine particle migration or clay swelling. The damage-reversing brine preferably has a high ionic strength and more preferably has a high concentration of dissolved monovalent cationic salts. Useful damage-reversing brines include potassium chloride, ammonium chloride and sodium chloride at a relatively high concentration.

Where permeability reduction is caused by blockage of the formation with migrating fine particles, damage reversal is effected primarily by mechanical means. The damage-reversing brine is displaced through the formation at a sufficient velocity and in the proper direction to dislodge the accumulated fine particles from permeability-reducing positions in the formation, i.e., the fine particles are dislodged from the pore throats and displaced into the pore bodies. The brine velocity should not be so great that it causes the fine particles to travel across the pore body into the opposite pore throat and form a new blockage. In the case of a production wellbore, the damage-reversing brine is injected into and displaced away from the wellbore to displace the fine particles into the pore bodies. In the case of an injection wellbore, the brine is first injected into and displaced away from the wellbore and then displaced at a high velocity back toward the wellbore to displace the fine particles into the pore bodies.

Determining a velocity sufficient to dislodge fine particles accumulated in a pore throat is a function of the stability of the fine particle bridge at the pore throat. Generally the fine particle bridge can be displaced by employing a displacement frontal advance rate of about 1 to about 10,000 meters per hour and preferably about 10 to about 1000 meters per hour. The treatment time is only long enough to displace the fine particles from the damaged pore throats into the pore bodies. This is a function of the treatment fluid velocity in the formation.

The sale concentration of the damage-reversing brine solution for treatment of migrated fine particles is in the range of about 0.2 wt % to about the solubility limit of the salt in the solution. The salt concentration is preferably about 1.0 to about 10 wt % and more preferably about 2.0 to about 4.0 wt %.

Where permeability reduction is caused by swelling of clays, treatment of the formation is effected by primarily chemical means. The treatment of swelling clays is less dependent on the direction and velocity of the injected brine and more dependent on the ionic makeup and concentration of the brine than the treatment of migrated fine particles. The damage-reversing brine is injected into the wellbore to reverse swelling of the clay at a frontal advance rate substantially lower than for treatment of migrated fine particles. The salt concentration of the damage-reversing brine solution is generally somewhat higher for treatment of the swelling clays, i.e., about 1.0 wt % up to about the solubility limit of the salt in the solution and preferably 2.0 to about 10 wt %. The clay is sufficiently contacted by an appropriate damage-reversing brine to induce shrinkage of the clay particles. The treatment time for contacting swelling particles with a damage-reversing brine is about 0.1 to about 72 hours and preferably about 1.0 to about 24 hours.

Once permeability damage caused by either fine particle migration or clay swelling has been reversed to a sufficient degree, injection and displacement of the damage-reversing brine are terminated. The second stage of the process is initiated upon termination of the damage-reversing brine treatment. A second treatment fluid, a stabilizing solution, is injected into the wellbore and displaced into the formation. The stabilizing solution contacts any fine particles present in the treatment volume and effectively reduces their future ability to swell or migrate from the pore bodies.

Treatment of the formation with the stabilizing solution is advantageously conducted at a finite solution flow rate since static treatment may result in minor formation permeability damage. Any frontal advance rate greater than about 0.7 meters per hour will effectively prevent treatment permeability damage. Although significantly larger frontal advance rates can be utilized, such rates usually provide little additional benefit. Successively larger flow rates should be avoided due to high chemical costs.

A number of stabilizing solutions are known in the art. Of these, aqueous potassium hydroxide is preferred because potassium hydroxide has been shown to permanently stabilize clays and other fine particles. The concentration of potassium hydroxide in the stabilizing solution is in the range of about 1.0 wt % up to about the solubility limit of potassium hydroxide in the solution, preferably about 5.0 to about 30 wt %, and more preferably about 15 to about 25 wt %. It is advantageous to use a damage-reversing brine and a stabilizing solution which are comprised of predominantly the same monovalent cation. Therefore, the damage-reversing brine is preferably a solution of potassium salts, e.g., potassium chloride, when the stabilizing solution is a potassium hydroxide solution.

The treatment time for the formation with a stabilizing solution is preferably from about 1.0 to about 48 hours, and more preferably about 24 hours. Once the stabilizing treatment is completed, the well may be returned to operation as an injection or production well and is substantially resistant to significant damage and permeability reduction even at high flow rates.

The process of the present invention is applicable to a wide range of subterranean formation temperature and also to a wide range of subterranean formation mineralogies. The process of the present invention can be applied to subterranean sandstone formations having a temperature of about 22° C. up to about 125° C. or higher.

In practice, the process of the present invention can be limited to treatment of the near wellbore environment of a subterranean sandstone formation. As utilized herein, the term "near wellbore" denotes the volume of a subterranean sandstone formation surrounding a wellbore penetrating the same, which exhibits relatively homogeneous horizontal characteristics. As a general guide, the near wellbore environment usually extends a radial distance into the formation of up to about 3 meters from the wellbore and may extend to about 9 meters or more. Since the greatest fluid pressure drop, fluid velocity and quantity of fluid transported occur in the near wellbore environment of a subterranean formation, the near wellbore environment is the volume of subterranean formation most susceptible to damage. Additionally, permeability damage in the near wellbore environment has the greatest effect on fluid injection and production. While the process of the present invention is not inherently limited to the near wellbore environment, far wellbore applications are relatively expensive and of decreased value since stabilization problems are less acute in the far wellbore region.

The following examples are illustrative of the process of the present invention and are not to be construed as limiting the scope thereof.

EXAMPLE 1

An unfractured production well produces oil from an Oligocene-age reservoir having a temperature of 85° C. The reservoir is characterized as being a highly silicic sandstone which contains a large amount of authogenic migratable kaolinite clay. The well originally produces at about 1700 barrels of oil per day (BOPD) with very little water production. When the water cut reaches 20%, the oil productivity of the well declines rapidly at a rate of about 80% per year. The oil-productivity loss is caused by near-wellbore kaolinite clay-particle-migration permeability damage. The well is treated according to the process of the present invention when the productivity reaches about 300 barrels of fluid per day (BFPD) and 80 BOPD.

A 3 wt % KCl solution is injected at the maximum injection pressure of 20,700 kPa to a radial distance of 1.2 m away from the wellbore. The injection rate increases throughout injection of the KCl solution, but nearly levels out near the completion of injection. The KCl solution injection appears to temporarily reverse the clay-particle blockage of pore throats.

Next, at 15 wt % KOH solution is injected slowly over a 48-hour period to treat a radial distance 0.9 m from the wellbore. Thereafter, the KOH solution is slowly displaced away from the wellbore with a 3 wt % KCl solution and the well is shut in for 24 hours. The well is put back on production and produces for the first week at 1700 BFPD with 650 BOPD. After six months of post-treatment production, the well produces 1500 BFPD and 500 BOPD.

This example shows that near-wellbore clay-particle-migration permeability damage is reversible in a damaged production well. The restored permeability is rendered permanent by applying the appropriate clay stabilizer. This insures high level oil productivity unhindered by future near-wellbore clay-induced permeability damage.

EXAMPLE 2

An unfractured injection well in the reservoir of Example 1 initially takes 3700 BPD of injection water at a maximum injection pressure of 20,700 kPa. The injection water has an ionic composition nearly identical to that of the connate water. The injection water is ionically non-damaging, but prolonged high-rate injection of the water dislodges some of the migratable clays due to excessive hydrodynamic drag. After three years of injection, the injectivity of the well decreases to 900 BPD. The well suffers from near-wellbore clay-particle-migration permeability damage.

Permeability damage from clay-particle migration is reversed and the clay is stabilized by the following treatment. A 2 wt % KCl solution is injected into the well and out to a radial distance of 1.8 m away from the wellbore. The well is then pumped at the maximum production rate possible to produce the KCl solution. The production rate increases significantly during production of the KCl solution, indicating improved near-wellbore permeability due to dislodging of damaging clay particles in pore-throat restrictions.

A 15 wt % KOH solution is injected slowly over a 48-hour period into the well and out to a radial distance of 0.9 m away from the wellbore. After a significant spacer volume of a 2 wt % KCl solution is injected into the well, normal injection water is injected into the well at an equally slow rate for 48 hours. The well is then put back on injection at the maximum injection pressure of 20,700 kPa. For the first week, the well takes 1900 BPD of injection water. After 1.5 years of additional injection, the well takes 1750 BPD of injection water.

The treatment demonstrates that clay-particle damage to the near wellbore of an injection well can be reversed to a large degree. The clay particles can be permanently stabilized to prevent further permeability damage and to maintain the restored permeability.

While foregoing preferred embodiments of the invention have been described and shown, it is understood that all alternatives and modifications, such as those suggested and others, may be made thereto and fall within the scope of the invention.

I claim:

1. A process for improving oil recovery from a subterranean oil-bearing sandstone formation penetrated by a wellbore, said formation having a reduced permeability resulting from an encroaching fluid, comprising the steps of:

injecting a first damage-reversing treatment solution consisting essentially of at least one monovalent cationic salt and a solvent for said salt into said wellbore;

displacing said first treatment solution into said formation;

contacting said formation with said first treatment solution in a manner to restore an increased permeability to said formation;

injecting a second stabilizing treatment solution having a hydroxide-containing compound dissolved therein into said wellbore;

displacing said second treatment solution into said formation contacted by said first treatment solution;

contacting said formation with said second treatment solution to substantially maintain the increased permeability of said formation by substantially reducing the susceptibility of said formation to future permeability reduction from said encroaching fluid; and thereafter recovering oil from said oil-bearing formation having the increased permeability.

2. The process of claim 1 wherein said at least one monovalent cationic salt is selected from the group consisting of potassium, sodium, ammonium salt, and mixtures thereof.

3. The process of claim 1 wherein said hydroxide-containing compound is potassium hydroxide.

4. The process of claim 3 wherein said at least one monovalent cationic salt is potassium salt.

5. A process for restoring and maintaining an increased permeability in a damaged subterranean hydrocarbon-bearing sandstone formation penetrated by a wellbore, said formation having a reduced permeability resulting from migration of fine particles into permeability-reducing positions in said formation, said migration induced by an encroaching fluid, the process comprising the steps of:

injecting a first damage-reversing treatment solution consisting essentially of at least one monovalent cationic salt and a solvent for said salt into said wellbore;

displacing said first treatment solution into said damaged formation in a direction and at a frontal advance rate sufficient to mechanically dislodge said fine particles from said permeability-reducing positions thereby restoring the increased permeability of said formation;

injecting a second stabilizing treatment solution having a hydroxide-containing compound dissolved therein into said wellbore;

displacing said second treatment solution into said formation contacted by said first treatment solution; and contacting said formation with said second treatment solution to substantially maintain the increased permeability of said formation by substantially reducing the susceptibility of said formation to future permeability reduction from said encroaching fluid.

6. The process of claim 5 wherein said migration of said fine particles is from one or more pore bodies in said formation and said permeability-reducing positions are in one or more pore throats in said formation.

7. The process of claim 5 wherein said encroaching fluid is a fresh water.

8. The process of claim 6 wherein said encroaching fluid is an injection fluid injected into said formation via said wellbore, said injection fluid displaced through said formation at a frontal advance rate sufficient to mechanically dislodge said fine particles from said one more or pore bodies into said one or more pore throats.

9. The process of claim 6 wherein said wellbore is a hydrocarbon production wellbore.

10. The process of claim 9 wherein said direction of displacement of said first treatment solution is away from said wellbore.

11. The process of claim 6 wherein said wellbore is a fluid injection wellbore.

12. The process of claim 11 wherein said direction of displacement of first treatment solution is toward said wellbore in a backflowing manner.

13. The process of claim 5 wherein said hydroxide-containing compound is potassium hydroxide.

14. The process of claim 5 wherein said at least one monovalent cationic salt is selected from the group consisting of potassium, sodium, ammonium salt, and mixtures thereof.

15. The process of claim 13 wherein said at least one monovalent cationic salt is potassium salt.

16. The process of claim 5 wherein said first and second treatment solutions are displaced into a volume of said formation near said well-bore.

17. A process for restoring and maintaining an increased permeability in a damaged subterranean hydrocarbon-bearing sandstone formation penetrated by a wellbore, said formation having a reduced permeability resulting from swelling of clay particles in said formation, said swelling induced by an encroaching fluid, the process comprising the steps of:

injecting a first damage-reversing treatment solution consisting essentially of at least one monovalent cationic salt and a solvent for said salt into said wellbore;

displacing said first treatment solution into said damaged formation;

contacting said formation with said first treatment solution in a manner to restore the increased permeability to said formation by reversing said swelling of said clay;

injecting a second stabilizing treatment solution having a hydroxide-containing compound dissolved therein into said wellbore;

displacing said second treatment solution into said formation contacted by said first treatment solution; and contacting said formation with said second treatment solution to substantially maintain the increased permeabilty of said formation by substantially reducing the susceptibilty of said formation to future permeability reduction from said encroaching fluid.

18. The process of claim 17 wherein said first damage-reversing treatment solution has a dissolved salt concentration of about 2 to about 10 wt %.

19. The process of claim 17 wherein said hydroxide-containing compound is potassium hydroxide.

20. The process of claim 17 wherein said at least one monovalent cationic salt is selected from the group consisting of potassium, sodium, ammonium salt, and mixtures thereof.

21. The process of claim 19 wherein said at least one monovalent cationic salt is potassium salt.

22. The process of claim 17 wherein said first and second treatment solutions are displaced into a volume of said formation near said well-bore.

* * * * *